United States Patent
Dannenhauer et al.

(10) Patent No.: US 7,325,823 B2
(45) Date of Patent: Feb. 5, 2008

(54) GAS BAG MODULE

(75) Inventors: Reiner Dannenhauer, Welzheim (DE); Norbert Lang, Leinzell (DE); Dirk Schultz, Heubach (DE); Rolf Mangold, Ruppertshofen (DE)

(73) Assignee: TRW Automotive GmbH, Alfdorf (DE)

( * ) Notice: Subject to any disclaimer, the term of this patent is extended or adjusted under 35 U.S.C. 154(b) by 237 days.

(21) Appl. No.: 10/834,471

(22) Filed: Apr. 29, 2004

(65) Prior Publication Data

US 2004/0217579 A1    Nov. 4, 2004

(30) Foreign Application Priority Data

May 2, 2003   (DE) .................. 203 06 818 U

(51) Int. Cl.
B60R 21/20 (2006.01)

(52) U.S. Cl. ................................. 280/728.2

(58) Field of Classification Search ............ 280/728.2, 280/732, 728.1
See application file for complete search history.

(56) References Cited

U.S. PATENT DOCUMENTS

| | | | | |
|---|---|---|---|---|
| 3,787,074 A | * | 1/1974 | Lewis et al. ................. | 280/731 |
| 3,891,233 A | * | 6/1975 | Damon ........................ | 280/737 |
| 4,153,273 A | | 5/1979 | Risko | |
| 4,249,673 A | * | 2/1981 | Katoh et al. ................. | 222/3 |
| 4,316,874 A | * | 2/1982 | Kasama et al. .............. | 422/126 |
| 4,711,466 A | * | 12/1987 | Breed ........................ | 280/741 |
| 4,796,912 A | * | 1/1989 | Lauritzen et al. ........... | 280/736 |
| 4,919,897 A | | 4/1990 | Bender et al. | |
| 5,000,479 A | * | 3/1991 | Werner et al. ............... | 280/736 |
| 5,028,070 A | * | 7/1991 | Bender ........................ | 280/741 |
| 5,100,174 A | * | 3/1992 | Jasken et al. ................ | 280/741 |
| 5,253,895 A | * | 10/1993 | Bretfeld et al. .............. | 280/736 |
| 5,294,414 A | | 3/1994 | Brede et al. | |
| 5,458,364 A | * | 10/1995 | Mueller et al. ........... | 280/728.2 |
| 5,542,701 A | * | 8/1996 | Rion ........................... | 280/735 |
| 5,611,566 A | * | 3/1997 | Simon et al. ................ | 280/736 |
| 5,687,988 A | * | 11/1997 | Storey et al. .............. | 280/728.2 |
| 5,762,368 A | | 6/1998 | Faigle et al. | |
| 5,803,488 A | * | 9/1998 | Bailey et al. .............. | 280/728.2 |
| 5,823,566 A | * | 10/1998 | Manire ..................... | 280/728.3 |
| 6,176,511 B1 | * | 1/2001 | Adkisson et al. ......... | 280/728.2 |
| 2004/0070186 A1 | | 4/2004 | Blerwirth et al. | |

FOREIGN PATENT DOCUMENTS

| | | |
|---|---|---|
| DE | 3742656 | 12/1988 |
| DE | 90131312 | 1/1991 |
| DE | 4138988 | 6/1992 |
| DE | 4102615 | 8/1992 |
| DE | 10240640 | 2/2004 |
| EP | 1396396 | 3/2004 |
| JP | 09058397 | 3/1997 |

* cited by examiner

*Primary Examiner*—Faye M. Fleming
(74) *Attorney, Agent, or Firm*—Tarolli, Sundheim, Covell & Tummino LLP

(57) ABSTRACT

A gas bag module has a generally cylindrical gas generator, at least one igniter and a housing to which the gas generator is secured. The igniter extends radially out of the gas generator and is secured to the housing. A gas bag is arranged in the housing and is clamped between the gas generator and the housing.

7 Claims, 3 Drawing Sheets

GAS BAG MODULE

The invention relates to a gas bag module having a generally cylindrical gas generator, at least one igniter and a housing to which the gas generator is secured. The invention relates in particular to a gas bag module for a vehicle front passenger.

BACKGROUND OF THE INVENTION

Such a gas bag module should require a minimal construction space and be light in weight. Moreover, it should have a simple construction in order to permit a production thereof at low cost. Finally, the leakage losses are to be small when the gas bag is inflated in order to achieve an efficiency that is as high as possible.

It is the object of the invention to provide a cost-effective gas bag module of the aforementioned kind meeting the requirements stated.

BRIEF DESCRIPTION OF THE DRAWINGS

For this purpose there is provided a gas bag module having a generally cylindrical gas generator, at least one igniter and a housing to which the gas generator is secured, the igniter extending radially out of the gas generator and being secured to the housing. A gas bag is provided which is clamped between the gas generator and the housing. The invention is based on the basic idea to use the igniter for fastening the gas generator to the housing. In this way a simple construction is achieved for one thing, because the fastening sheets etc. usually used in other arrangements can be dispensed with; for fastening the gas generator in the housing a component which is available anyway is used. Only a small expense is required to design this component in such a manner that it is suitable for fastening purposes. Moreover, there are very small leakage losses, because the igniter may be connected directly from outside the housing; no passages for cables etc. are required that were necessary in the prior art for an igniter completely located inside the housing. A further advantage resides in the fact that the gas generator may be integrated into the module such that the structural strength of the gas generator becomes a relevant part of the mechanical component strength of the entire gas bag module. The gas bag being clamped by the gas generator, the inserts usually used in other arrangements for fastening the gas bag to the housing can be dispensed with. Thus, a particularly simple structure having a small number of components is achieved.

For fastening the igniter to the housing the igniter may be provided with a holding geometry by means of which it is arrested at the housing so that the gas generator is firmly connected to the housing. As a holding geometry there may be used in particular a male thread onto which a nut is screwed which is located outside the housing and in this way firmly connects the gas generator to the housing. It is possible as well to use as a holding geometry a groove in which a holding ring is inserted.

Advantageous designs of the invention will be apparent from the sub-claims.

BRIEF DESCRIPTION OF THE DRAWINGS

Figure 1:
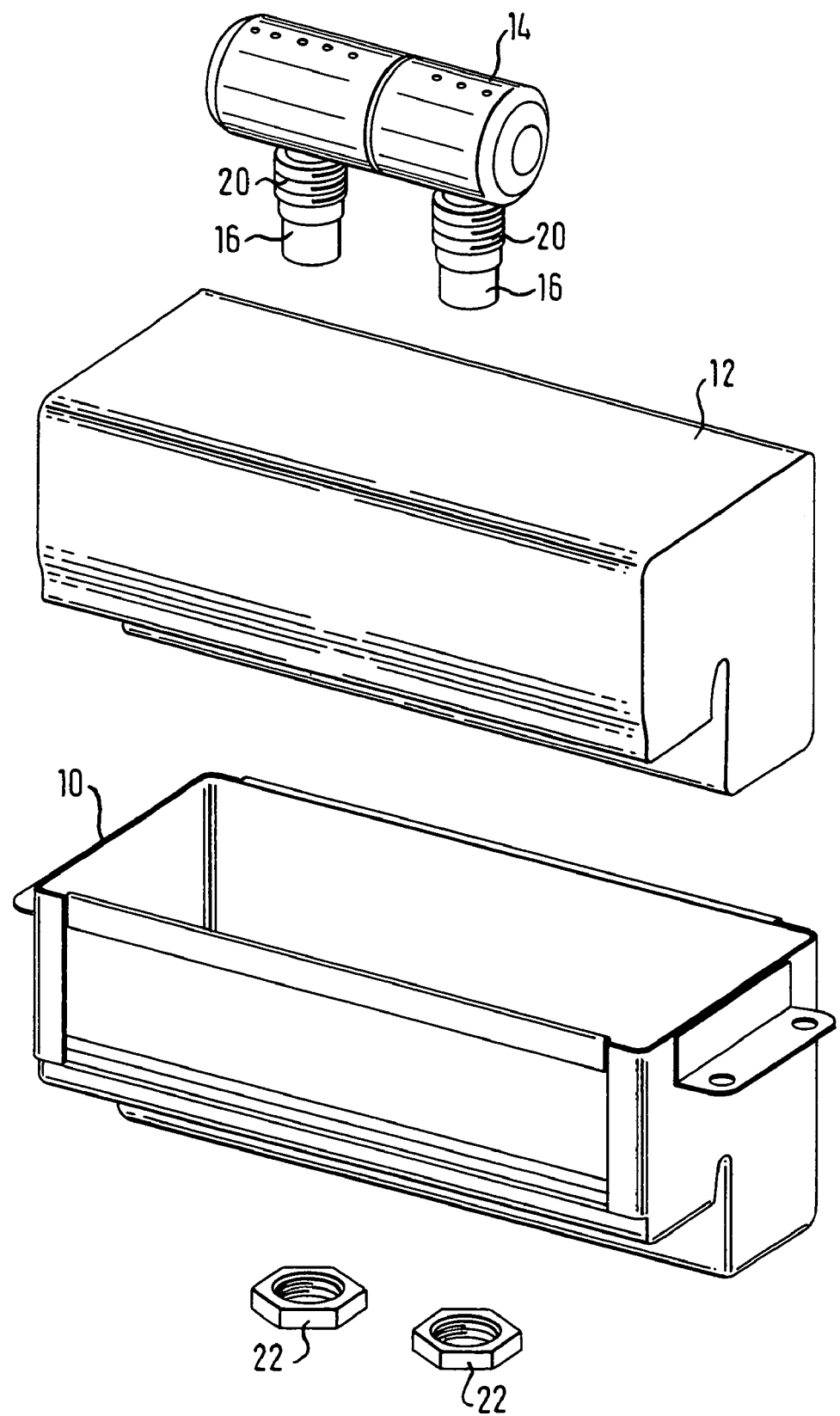
Figure 2:
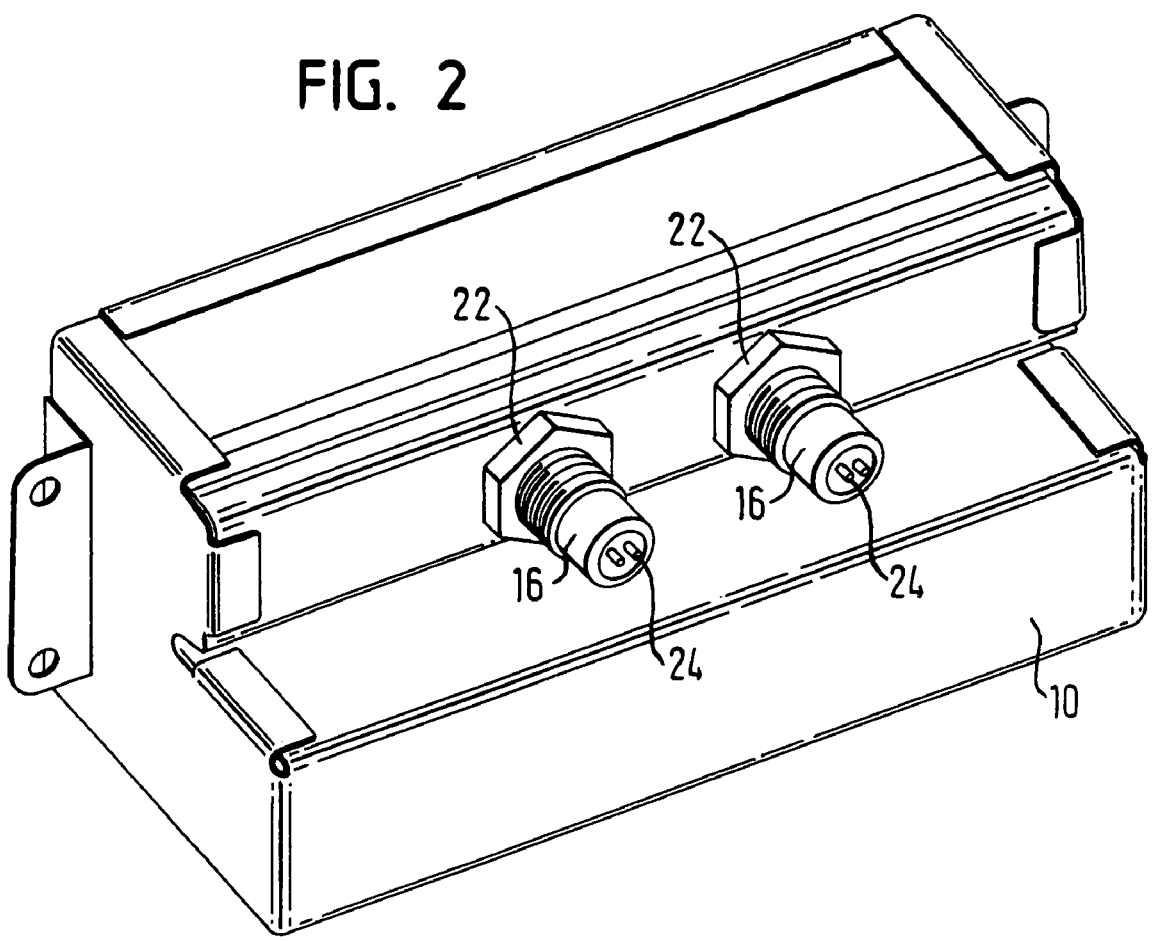
Figure 3:
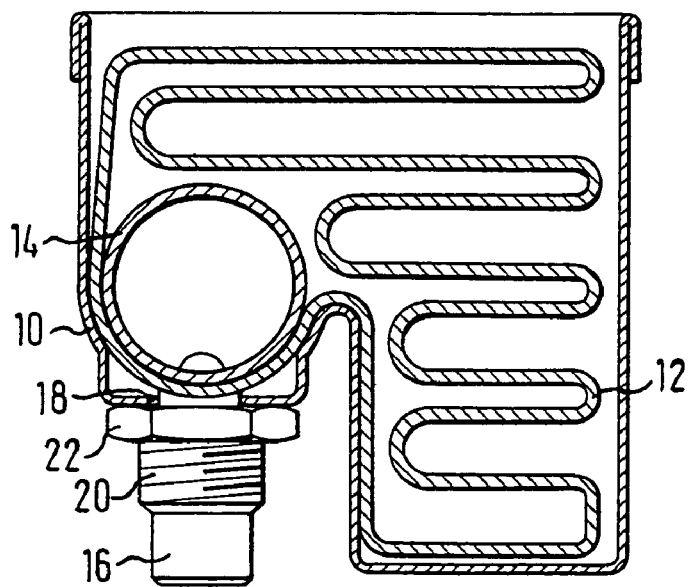
Figure 4:
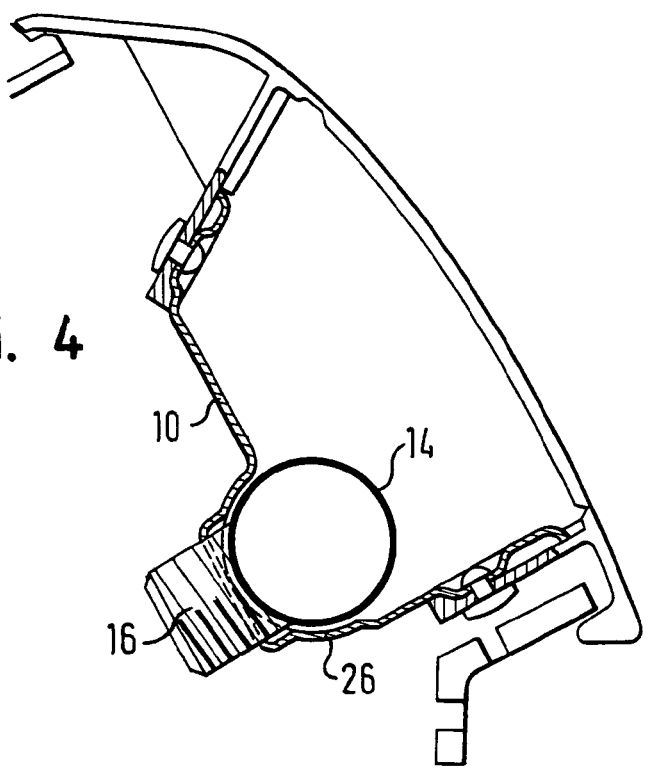
Figure 5:
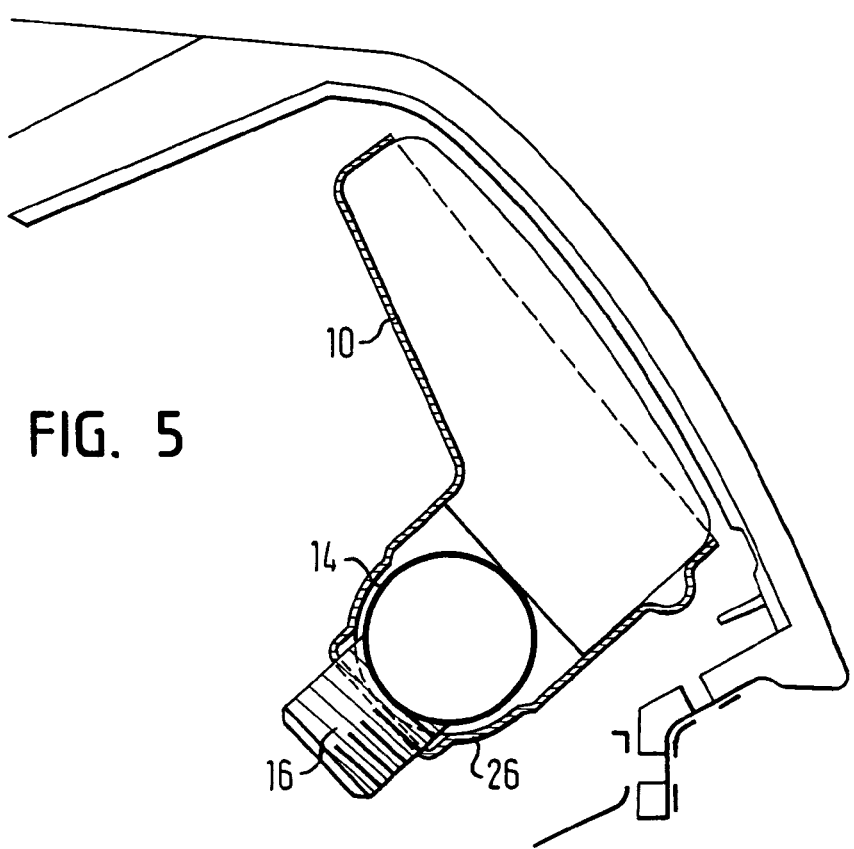

The invention is described in the following with the aid of a preferred embodiment represented in the accompanying drawings, in which:

FIG. 1 shows a perspective exploded view of a gas bag module in accordance with the invention;

FIG. 2 shows a perspective bottom view of the gas bag module assembled;

FIG. 3 shows a sectional view through the gas bag module in accordance with the invention;

FIG. 4 shows in a schematic section a gas bag module according to a first variant; and FIG. 5 shows in a schematic section a gas bag module according to a second variant.

DETAILED DESCRIPTION OF THE INVENTION

In FIGS. 1 to 3 there is shown a gas bag module comprising a housing 10. The housing 10 serves to accommodate a folded gas bag 12 as well as a gas generator 14. The gas generator, which is designed here as a cylindrical tube gas generator, is adapted to furnish after activation a compressed gas by means of which the gas bag 12 may be deployed in a manner known as such. The housing 10 may consist of sheet metal and serves on the one hand as a mount for the other components of the gas bag module and on the other hand permits the gas bag module to be fastened in a vehicle.

The gas generator 14 is provided with two igniters 16 radially arranged relative to the centerline of the gas generator 14. Each of the igniters is associated with a gas-generating charge of its own; the gas generator is of the 2-stage type. A gas generator having more than 2 stages may, however, be used as well.

The housing 10 is provided with two openings 18 through which the sections of the igniters 16 located outside the gas generator 14 extend out of the housing. These sections of the igniters 16 located outside the housing are each provided with a holding geometry 18 which in the embodiment shown in FIGS. 1 to 3 is a male thread 20. On each male thread 20 a nut 22 may be screwed.

As shown in FIG. 3, the gas generator 14 is located in the interior of the gas bag 12. When the gas generator is placed within the housing 10 and the nuts 22 are tightened, the gas bag 12 is clamped between the gas generator 14 and the housing 10 so that it is firmly fastened there.

As shown in FIG. 2, the igniters 16 are provided on their free end facing away from the gas generator 14 with one plug connection 24 each, through which the two gas generators may be connected to an ignition device. It is apparent that no separate passage for a wire or something similar into the interior of the gas bag module is required. In this way a particularly high gas-tightness is achieved.

In FIG. 4 a gas bag module according to a first variant is schematically shown. In this arrangement the housing 10 is configured with a trough-shaped receiving section 26 for the gas generator 14. Since the gas generator 14 may support itself on the inner side of the housing 10 over a large surface area, the gas generator decisively contributes to the structural strength of the entire housing 10.

In FIG. 5 there is shown a second variant. The difference to the first variant resides in the fact that the trough-shaped receiving section 26 is embodied more deeply.

The invention claimed is:

1. A gas bag module having a generally cylindrical gas generator, at least one igniter and a housing separate from the gas generator to which said gas generator is secured, said igniter extending radially out of said gas generator and being secured to said housing, and a gas bag which is clamped between said gas generator and said housing.

2. The gas bag module according to claim 1, wherein said igniter extends out of said housing through an opening in said housing.

3. The gas bag module according to claim 1, wherein said igniter is provided with a holding geometry by which said igniter is arrested at said housing so that said gas generator is firmly connected to said housing.

4. The gas bag module according to claim 3, wherein said holding geometry is a male thread onto which a nut is screwed so that said gas generator is firmly screwed together with said housing.

5. The gas bag module according to claim 3, wherein said holding geometry is a groove in which a holding ring is inserted so that said gas generator is firmly connected to said housing.

6. A gas bag module having a generally cylindrical gas generator, at least one igniter and a housing to which said gas generator is secured, said igniter extending radially out of said gas generator and being secured to said housing, and a gas bag which is clamped between said gas generator and said housing, wherein said housing comprises a trough-shaped receiving section for said gas generator, said housing being separate from said gas generator.

7. The gas bag module according to claim 1, wherein said gas generator is located in the interior of said gas bag.

* * * * *